United States Patent [19]

Frey, Jr. et al.

[11] Patent Number: 5,130,992
[45] Date of Patent: Jul. 14, 1992

[54] FILE-BASED REDUNDANT PARITY PROTECTION IN A PARALLEL COMPUTING SYSTEM

[75] Inventors: Alexander H. Frey, Jr., Pasadena; Richard C. Mosteller, Sierra Madre, both of Calif.

[73] Assignee: International Business Machines Corporaiton, Armonk, N.Y.

[21] Appl. No.: 510,283

[22] Filed: Apr. 16, 1990

[51] Int. Cl.$^5$ .............................................. G06F 11/10
[52] U.S. Cl. ..................................... 371/401; 371/51.1
[58] Field of Search ................... 371/39.1, 40.1, 38.1, 371/40.1, 51.1

[56] References Cited

U.S. PATENT DOCUMENTS

| | | | |
|---|---|---|---|
| 4,396,983 | 8/1983 | Segarra et al. | 364/200 |
| 4,412,285 | 10/1983 | Neches et al. | 364/200 |
| 4,430,699 | 2/1984 | Segarra et al. | 364/200 |
| 4,722,085 | 1/1988 | Flora et al. | 371/38 |
| 4,761,785 | 8/1988 | Clark et al. | 371/51 |
| 4,817,035 | 3/1989 | Timsit | 364/900 |
| 4,914,656 | 4/1990 | Dunphy, Jr.et al. | 371/10.2 |
| 4,989,205 | 1/1991 | Dunphy, Jr. et al. | 371/10.1 |

*Primary Examiner*—Charles E. Atkinson
*Attorney, Agent, or Firm*—Perman & Green

[57] ABSTRACT

This is method for parity protecting distributed data files in a multi-node, parallel data processing network, with each node having a data store. Each data file is organized as a series of fixed size file data blocks, each file data block being comprised of a block identifier and a plurality of data bit positions. The method comprises: distributing at least N-1 file data blocks across N-1 nodes, each of the N-1 file data blocks being stored in a data store at an available physical location, which physical location may be selected from any within an area of the data store reserved for file data blocks, each data store having an associated directory indicating where each file data block is located; exclusive OR'ing data bits in corresponding bit positions in each of the N-1 file data blocks; and storing the Exclusive OR results in corresponding bit positions of a parity file data block in a data store in node N.

8 Claims, 3 Drawing Sheets

| $N_0$ | $N_1$ | $N_2$ | $N_3$ | $N_4$ | $N_5$ | $N_6$ | $N_7$ |
|---|---|---|---|---|---|---|---|
| $P_0$ | $P_1$ | $P_2$ | $P_3$ | $P_4$ | $P_5$ | $P_6$ | $P_7$ |
| $_7B_0$ | $_7B_1$ | $_7B_2$ | $_7B_3$ | $_7B_4$ | $_7B_5$ | $_7B_6$ | $_6B_7$ |
| $_6B_8$ | $_6B_9$ | $_6B_{10}$ | $_6B_{11}$ | $_6B_{12}$ | $_6B_{13}$ | $_5B_{14}$ | $_5B_{15}$ |
| $_5B_{16}$ | $_5B_{17}$ | $_5B_{18}$ | $_5B_{19}$ | $_5B_{20}$ | $_4B_{21}$ | $_4B_{22}$ | $_4B_{23}$ |
| $_4B_{24}$ | $_4B_{25}$ | $_4B_{26}$ | $_4B_{27}$ | $_3B_{28}$ | $_3B_{29}$ | $_3B_{30}$ | $_3B_{31}$ |
| $_3B_{32}$ | $_3B_{33}$ | $_3B_{34}$ | $_2B_{35}$ | $_2B_{36}$ | $_2B_{37}$ | $_2B_{38}$ | $_2B_{39}$ |
| $_2B_{40}$ | $_2B_{41}$ | $_1B_{42}$ | $_1B_{43}$ | $_1B_{44}$ | $_1B_{45}$ | $_1B_{46}$ | $_1B_{47}$ |
| $_1B_{48}$ | $_0B_{49}$ | $_0B_{50}$ | $_0B_{51}$ | $_0B_{52}$ | $_0B_{53}$ | $_0B_{54}$ | $_0B_{55}$ |

FIG. 6

$P_0 = B_{49} \oplus B_{50} \oplus B_{51} \oplus B_{52} \oplus B_{53} \oplus B_{54} \oplus B_{55}$ $P_1 = B_{42} \oplus B_{43} \oplus B_{44} \oplus B_{45} \oplus B_{46} \oplus B_{47} \oplus B_{48}$ $P_2 = B_{35} \oplus B_{36} \oplus B_{37} \oplus B_{38} \oplus B_{39} \oplus B_{40} \oplus B_{41}$ $P_3 = B_{28} \oplus B_{29} \oplus B_{30} \oplus B_{31} \oplus B_{32} \oplus B_{33} \oplus B_{34}$ $P_4 = B_{21} \oplus B_{22} \oplus B_{23} \oplus B_{24} \oplus B_{25} \oplus B_{26} \oplus B_{27}$ $P_5 = B_{14} \oplus B_{15} \oplus B_{16} \oplus B_{17} \oplus B_{18} \oplus B_{19} \oplus B_{20}$ $P_6 = B_7 \oplus B_8 \oplus B_9 \oplus B_{10} \oplus B_{11} \oplus B_{12} \oplus B_{13}$ $P_7 = B_0 \oplus B_1 \oplus B_2 \oplus B_3 \oplus B_4 \oplus B_5 \oplus B_6$

FIG. 7

FILE-BASED REDUNDANT PARITY PROTECTION IN A PARALLEL COMPUTING SYSTEM

FIELD OF THE INVENTION

This invention relates to a parallel computing system wherein files are distributed across the system and, more particularly, to a parallel computing system wherein distributed files are parity protected by redundant parity, integral to the file structure.

BACKGROUND OF THE INVENTION

Many large scale data processing systems now employ a multiplicity of independent computer/disk systems, all of which operate in parallel on discrete portions of a problem. An independent computer/disk is called a node of the multi-processing system. In such systems, it can be the case that data files are distributed across the system so as to balance nodal work loads and to protect against significant losses of data should one or more nodes malfunction.

A variety of techniques have been proposed to enable data reconstruction in the event of failure of one or more nodes. For instance, in U.S. Pat. No. 4,722,085 to Flora, a relatively large number of independently operating disk subsystems are coupled to a read/write interface containing error circuitry and organization circuitry. Each data word read into the system has its bits spread across the disk files so that only one bit of each word is written to a particular physical disk file. This assures that a single bit error will not cause a fault since it is automatically corrected by parity correction in the error circuitry. U.S. Pat. No. 4,817,035 to Timsit also describes a similar, bit-oriented, distributed storage across a plurality of disk units.

In U.S. Pat. No. 4,761,785 to Clark et al., assigned to the same assignee as this application, another version of distributed storage is described to enable data recovery in the event of a malfunction. The Clark et al. system employs the concept of the spreading of data blocks across a plurality of disk drives and exclusive-Or'ing a series of blocks to derive a parity check block. Each disk drive contains the same number of block physical address areas. Disk physical address areas with the same unit address ranges are referred to as "stripes". Each stripe has n-1 blocks of data written across n-1 disk drives and a parity block on another disk drive, which parity block contains parity for the n-1 blocks of the stripe. Since a stripe of blocks is written across a plurality of disk drives, the failure of any one disk drive can be accommodated by employing the parity block and exclusive-Or'ing it with all remaining blocks, to derive the lost data block.

While the system described by Clark et al. does effectively protect data blocks from single disk failures, it exhibits drawbacks First, and most importantly, it is dependent for its structure upon physical block positions in individual disk drives. In other words, the parity for the n-1 blocks is derived based upon each block's physical location on a disk. Thus, if any movement of data blocks is contemplated within a disk drive, the parity must be rewritten each time a block is moved. Furthermore, when a complete file is removed from a disk drive, the parity constructed by Clark et al. may or may not be relevant, depending upon where the file blocks were located in the disk structure. (The parity is only applicable to physical disk addresses and not to the file blocks per se, so if the file blocks are not exclusively coincident with the stripes, the parity structure must be maintained even after the file has been deleted.) Finally, employing a parity structure such as described by Clark et al. requires substantial constraints be placed upon the system programmer in terms of where data blocks are to be allocated on the disk drive surface.

Accordingly, it is an object of this invention to provide for a parallel computing system, a file-based, parity protection structure which is integral to the file structure rather than the physical disk structure.

It is another object of this invention to provide a block-parity protection method which enables data blocks to be placed anywhere on an array of disk files, while still retaining file parity protection.

It is still another object of this invention to provide a redundant parity protection system for distributed computing, file-based data that enables generated parity blocks to move with a data file and to still be relevant to and only to the data file, upon removal of the file from disks.

SUMMARY OF THE INVENTION

A method is described for parity protecting distributed data files in a multi-node, parallel data processing network, with each node having a data store. Each data file is organized as a series of fixed-size file data blocks, each file data block being comprised of a block identifier and a plurality of data bit positions. The method comprises:
  a. distributing at least N-1 file data blocks across N-1 nodes, each of said N-1 file data blocks being stored in a data store at an available physical location, which physical location may be selected from any within an area of said data store reserved for file data blocks, each said data store having an associated directory indicating where each file data block is located;
  b. exclusive OR'ing data bits in corresponding bit positions in each of said N-1 file data blocks; and
  c. storing the results of step (b) in corresponding bit positions of a parity file data block in a data store in node N.

DESCRIPTION OF THE DRAWINGS

FIG. 6 is a chart indicating an 8 node configuration showing an 8 block parity configuration, with parity blocks segregated from file data blocks.

FIG. 7 illustrates a series of equations employed to generate parities for the arrangement of FIG. 6.

DETAILED DESCRIPTION OF THE INVENTION

Figure 1:
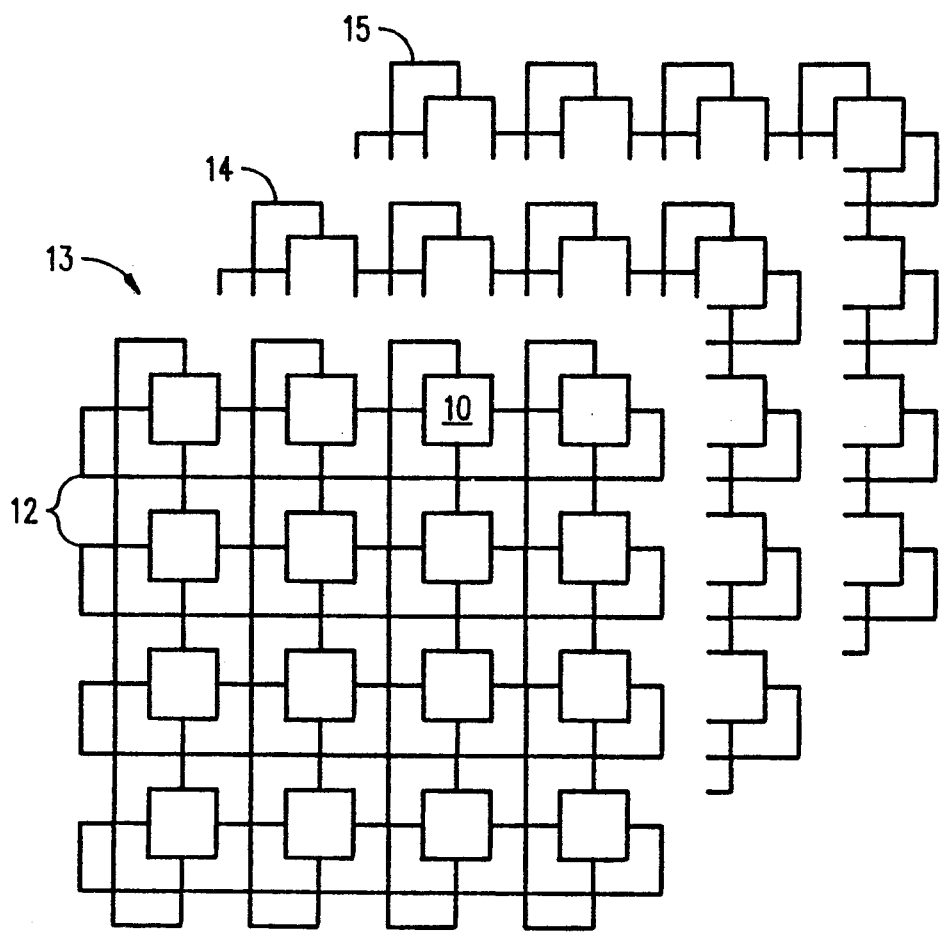
FIG. 1 is a block diagram of a network of communication interconnections of a multi-node, parallel computing system.

Referring to FIG. 1, a block diagram is shown of a parallel computing system and comprises a number of "nodes" 10 interconnected by high speed communication lines. Each node 10 comprises a processor and memory (e.g., disk memory); operates independently; and interacts with other nodes via the communication network. The topology shown in FIG. 1 is representative of one form of acceptable network and is that of a three-dimensional torus with each box 10 representing a node and each line 12 representing a communication link. A first "plane" 13 of the parallel computing system is shown and is overlaid over underlying planes 14 and 15. Each node has two additional links (not shown), one to a counterpart node in the two-dimensional torus above and one to the counterpart in the two-dimensional torus below.

Figure 2:
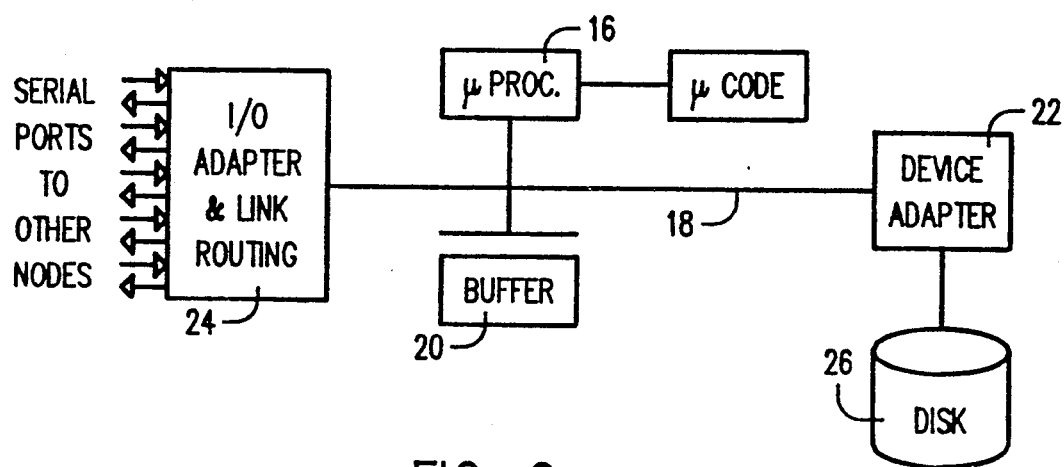
FIG. 2 is a block diagram illustrating the configuration of a node in FIG. 1.

As shown in FIG. 2, each node comprises a microprocessor 16 which is interconnected to other elements of the node via a bus structure 18. Buffer memory 20, device adapter 22 and I/O adapter and link router 24 are also connected to bus 18. A disk file 26 is connected to device adapter 22 and is controlled thereby to provide the main memory for the node.

The parallel computing system shown in FIGS. 1 and 2 employs software which is organized on a file basis, with each file having one or more data blocks of predetermined length. For instance, an exemplary block size may include 1024 bytes. Each block includes a block identifier which uniquely identifies the block.

From a user's perspective, a file appears as a single, uniform, identical entity from any node. This is so, even though a file may comprise a single file block or many file blocks. Each file is accessed through a system-wide, unique pointer. Through the use of that pointer, a process can look up a further pointer corresponding to a file, through a directory. This pointer provides access to a table entry that describes the file and indicates the physical location on the disks of the data and parity blocks of the file. It should be understood that the length of a file data block can be any value determined by the file creator and does not depend upon the system's configuration.

In the system shown in FIG. 1, a first block of records in a file is placed in a node that "owns" the file, with the next file data block being placed in the next node, etc. Consecutive blocks are placed on consecutively numbered nodes until the last node of a prespecified span is reached. The owning node is defined as the node at which record 0 for the file is written. The "span" designates the number of nodes over which the file will be spread. Parity blocks are inserted with the file data blocks. It is to be emphasized that the parity block and its generation comprises a file parameter which is not limited by the position where any particular file data block or parity block is stored.

The rationale for distributing file data blocks across a plurality of nodes is to assure data recovery in the event of failure of a node. If all file data blocks were stored sequentially in a single node, the failure of that node would result in the complete loss of the file. By distributing file data blocks across a group of sequentially numbered nodes, and then parity protecting the span of file data blocks by the addition of a redundant parity block, the malfunction of any one such node can be overcome. This is accomplished by the use of the parity block(s) to regenerate the file data block(s) lost as a result of the malfunction.

Figures 3, 4, 5:
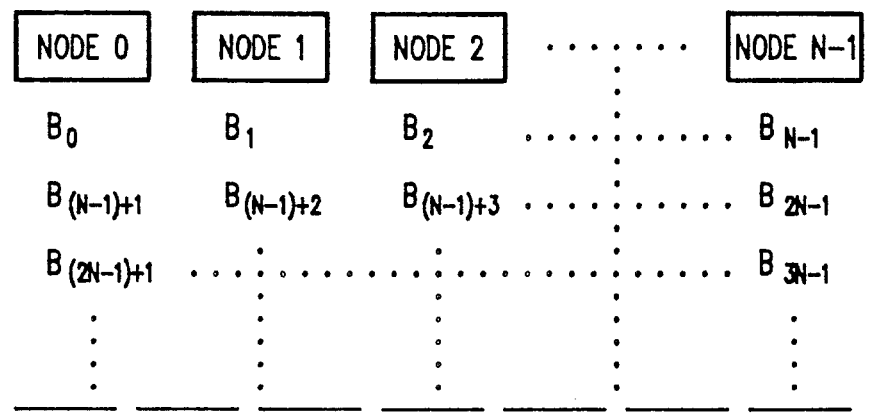
FIG. 3 is a diagram of a plurality of nodes indicating one mode of file data block distribution, each column indicating blocks of data from a single file that are stored on the node indicated at the top of the column.
FIG. 4 is a diagram of an 8 node system similar to that in FIG. 3 showing a 5 block parity configuration, wherein parity blocks are interspersed with file data blocks.
FIG. 5 is a diagram of an 8 node configuration showing a 5 block parity configuration, wherein parity blocks are segregated from file data blocks.

In FIG. 3, a distributed file data block structure is illustrated, with node 0 being the owning block of a file which includes file data blocks $B_0 - B_{3n-1}$. Note that while the file data blocks are shown as being physically placed adjacent each other within each node, the placement of the file data blocks is strictly determined by available storage areas in the particular disk drive in which each file data block is located.

Referring back to FIG. 2, disk drive 26 will have one or more tracks allocated to a directory that indicates a particular track and physical position within the track at which a particular file data block is located. When the node is in operation, that directory will generally be read out and placed in an operating portion of the memory of microprocessor 16, to enable rapid accesses to be achieved to requested data. Disk 26 and its associated device adapter 22 place file data blocks in accordance with a "next available" empty physical storage space in a track. Thus, there is no predetermined positional constraint on the position of any file data block within disk memory 26. Therefore a file data block may be positioned anywhere within disk memory 26 reserved for file data blocks, so long as its position is noted in the disk drive directory.

In the prior art, as represented by the Clark U.S. Pat. No. 4,761,785, successive file data blocks are placed in corresponding disk drive physical storage positions on successive nodes. Parity data blocks derived from the exclusive-OR function performed on corresponding physical, disk drive storage areas are also stored in corresponding physical disk drive storage positions. The Clark et al. parity protection scheme is therefore based on physical block storage positions in adjoining disk drives rather than on the file data blocks themselves. As above stated, this creates a number of problems — especially when it came to moving data files throughout the system.

The method for generating a parity block from a series of file data blocks involves exclusive OR'ing corresponding bit positions in each file data block of a span to derive the corresponding parity bit position in the parity data block. Thus, for each of the corresponding bit positions in each file data block, there is a corresponding bit position in the parity data block which is the exclusive OR function of the bit values of the corresponding file data block bit positions. It is known that the loss of any one file data block or parity data block in a distributed file system structure can be reconstructed by exclusive OR'ing the remaining file data blocks and/or parity block.

In FIG. 4, a distributed file structure is illustrated wherein parity blocks are interspersed with file data blocks. As is there shown, the data distribution occurs across 8 nodes, i.e., nodes n0-n7. File data block $B_0$ is allocated to node n0, file data block $B_1$ to N1, $B_2$ to $N_2$ and $B_3$ to $N_3$. The parity block for blocks $B_0$ to $B_3$ (i.e., $P_{0-3}$) is placed in node n4. The only constraint to this arrangement is that each of blocks $B_0$, $B_1$, $B_2$, $B_3$, and $P_{0-3}$ must be stored on different nodes. Otherwise, if there is a duplication of two or more blocks on a single node, the loss of that node may result in a non-recoverable situation.

The next series of parity protected blocks starts with block $B_4$ and ends with block $B_7$, with the parity block $P_{4-7}$ being present on node N1. The next file data block series begins at node N2 and continues through node N6 etc.

This structure enables the parity blocks to be dispersed throughout the nodes and prevents any single node from being overloaded with parity blocks. It is to be noted that each time data is modified in one of the file data blocks, an updating must occur to the corresponding parity block. Thus, if all parity blocks were configured in a single or several nodes, those nodes would be greatly overworked and would slow down the effective speed of the system.

Turning to FIG. 5, a further data arrangement is shown wherein file data blocks may be sequentially arrayed across a series of nodes, with no interspersed parity blocks. In this instance, parity blocks are segregated to special reserved parity areas in the disk drives. For instance, the parity block $P_{0-3}$ for file data blocks $B_0-B_3$ is present on node N3. The parity block $P_{4-7}$ for data blocks $B_4-B_7$ is resident on node N7 (in its reserved parity area). This data structure enables sequentially numbered file data blocks to be arrayed across sequentially numbered nodes and enables the data structure to be easily expanded if additional nodes are added. It avoids the necessity of concern over where the parity blocks are located when changing the file data block structure.

In FIG. 6, a more detailed layout of the data structure of FIG. 5 is shown; however in this case, the block span is 8 blocks, with the eighth block being the parity block. It will be noted that parity blocks $P_0-P_7$ are allocated across nodes N0-N7. The subscripts in front of each block indication i.e. $_7B_0$ means that the parity for block $B_0$ is in parity block $P_7$ in node N7. FIG. 7 indicates the Boolean equations which enable generation of parities $P_0-P_7$. From FIG. 7 it can be seen that parity $P_0$ is generated from exclusive OR'ing of blocks $B_{49}-B_{55}$, $P_1$ from blocks $B_{42}-B_{48}$ etc., etc.

It should again be emphasized that the data structure described above is file-oriented and is not dependent upon the particular physical position on a disk drive where a file data block is stored. Thus, when a particular file is accessed and moved, it brings with it the associated parity block (or blocks) so that parity is continually retained during the operation of the system.

Each parity block is updated whenever data is written in a file that is parity protected. When a file data block is updated, the new data is placed in a buffer. The node additionally reads the old data from the disk drive and places it in another buffer (if it is not currently in a buffer). Then, a new parity "delta" is computed as the modulo-2 sum (exclusive-OR) of the new data and the old data. The new parity delta are sent to the node that maintains the parity bits for that data. The parity node, upon receipt of the parity delta, exclusive OR's the delta with the parity for the data, stores in a temporary file both the old and the new parity values, and acknowledges its parity update to the originating node. This will, in effect, enable the system to reset itself and to re-perform the update function without loss of data.

In order to recover data in the event of a nodal failure, several nodes are employed, i.e., the parity node which is the node containing the parity of the data allocated to the failed node, all other nodes that have data contributing to that parity, and a designated new node that is a "spare" node especially reserved for replacement of a failed node. To reconstruct the data block, the parity node collects corresponding data blocks from all other nodes in the same parity group that contributed to the parity computation. It then proceeds to exclusive-OR each corresponding bit position in each of corresponding file data blocks to create a new file data block to replace the one which was on the failed node. Once the parity node has recovered an entire data block, it reads that data block to the spare node. This procedure continues for each file data block lost as a result of the nodal failure.

In the event of a failure of a parity data block node, reconstruction occurs exactly in the same manner, except that the new (formerly spare) node is chosen as the reconstructing node.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for parity protecting distributed data files in a multi-node computer network having at least N nodes, each node having data storage means, each data file organized as a series of file data blocks, each data block being comprised of a block identifier and a plurality of data bit positions, the method comprising:
   a. distributing at least N-1 file data blocks across N-1 nodes, each of said N-1 file data blocks being stored in a physical location in a data storage means, said physical location selected from any available physical location within an area of said data storage means allocated for file data blocks, each said data storage means maintaining a directory of where each file data block is located therein;
   b. exclusive OR'ing data bits in corresponding data bit positions in each of said N-1 file data blocks; and
   c. storing the results of step b in corresponding bit positions of a parity data block in a data storage means in node N.

2. The method of claim 1 wherein steps a-c are repeated across another set of N-1 nodes of said multi-node computer network for succeeding groups of N-1 file data blocks.

3. The method of claim 2 wherein each of said file data blocks in a given file has an identical number of data bit positions.

4. The method of claim 3 wherein, said nodes are sequential and step (a) further comprises the step of:
   a1. serially storing across sequential nodes in their respective data storage means, interspersed file data blocks and parity data blocks.

5. The method of claim 3, wherein said nodes are sequential, and step (a) further comprises the steps of:
   a1. serially storing across sequential nodes in their respective data storage means, file data blocks; and
   a2. storing in areas in said data storage means, segregated from said file data blocks, parity data blocks.

6. The method of claim 1 wherein in response to the failure of one said N nodes, every file data block stored in the data storage means in said failed node is reconstructed by the steps of:
   d. exclusive OR'ing data bits and parity bits from corresponding bit positions in the data storage means in non-failed ones of said N nodes; and
   e. storing the results of step (d) in an operational node separate from said non-failed ones of said N nodes.

7. A method for parity protecting a file system distributed across a multi-node, parallel computing system, comprising the steps of:
   a. allocating and storing a sequential series of N-1 file data blocks across N-1 separate nodes, said file data blocks having no predetermined physical storage relationship across said nodes;
   b. exclusive-OR'ing values in corresponding bit positions in said series of file data blocks to derive a parity data block; and
   c. storing said parity data block in an Nth node, said Nth node not being identical with any of said N-1 nodes.

8. The method of claim 7 wherein in response to the failure of one of said N nodes, a file data block stored in a failed node is reconstructed by the steps of:
   d. exclusive OR'ing data bits and parity bits from corresponding bit positions in non-failed ones of said N nodes; and
   e. storing the results of step (d) in an operational node separate from said non-failed ones of said N nodes.

* * * * *